United States Patent
Olaru (10) Patent No.: US 7,014,455 B2
(45) Date of Patent: Mar. 21, 2006

(54) VALVE-GATED INJECTION MOLDING SYSTEM WITH SIDE-MOUNTED ACTUATOR

(75) Inventor: George Olaru, Toronto (CA)

(73) Assignee: Mold-Masters Limited, Georgetown (CA)

( * ) Notice: Subject to any disclaimer, the term of this patent is extended or adjusted under 35 U.S.C. 154(b) by 99 days.

(21) Appl. No.: 10/386,933

(22) Filed: Mar. 13, 2003

(65) Prior Publication Data

US 2003/0224086 A1 Dec. 4, 2003

Related U.S. Application Data

(60) Provisional application No. 60/363,891, filed on Mar. 14, 2002.

(51) Int. Cl.
*B29C 45/23* (2006.01)

(52) U.S. Cl. .................. 425/564; 425/566; 425/572

(58) Field of Classification Search ............. 425/549, 425/562–566, 572
See application file for complete search history.

(56) References Cited

U.S. PATENT DOCUMENTS

| | | | |
|---|---|---|---|
| 3,037,245 A | 6/1962 | Darnell | |
| 3,241,191 A | 3/1966 | Nouel | |
| 3,488,810 A | 1/1970 | Gellert | |
| 3,491,408 A | 1/1970 | Natkins | |
| 3,671,159 A * | 6/1972 | Greenberg et al. | 425/573 |
| 3,677,682 A | 7/1972 | Putkowski | |
| 4,026,518 A | 5/1977 | Gellert | |
| 4,095,931 A | 6/1978 | Reitan | |
| 4,171,941 A | 10/1979 | Yotsutsuji et al. | |
| 4,173,448 A | 11/1979 | Rees et al. | |
| 4,222,733 A | 9/1980 | Gellert et al. | |
| 4,272,236 A | 6/1981 | Rees et al. | |
| 4,286,941 A | 9/1981 | Gellert | |
| 4,330,258 A | 5/1982 | Gellert | |
| 4,344,750 A | 8/1982 | Gellert | |
| 4,380,426 A | 4/1983 | Wiles | |
| 4,702,689 A | 10/1987 | Schmidt et al. | |
| 4,786,246 A | 11/1988 | Gellert | |
| 4,808,106 A | 2/1989 | Von Holdt | |
| 4,832,593 A | 5/1989 | Brown | |
| 4,919,606 A | 4/1990 | Gellert | |
| 4,923,387 A | 5/1990 | Gellert | |
| 4,981,431 A * | 1/1991 | Schmidt | 425/549 |
| 5,002,480 A | 3/1991 | Gellert et al. | |

(Continued)

FOREIGN PATENT DOCUMENTS

DE 37 33 363 A1 4/1989

(Continued)

OTHER PUBLICATIONS

Weick, P. "Moldmaking & Mold Design A Compact Method for Valve Gating Large Parts", Plastics Engineering, vol. 50, No. 9, pp. 23-25, Sep. 1, 1994.

(Continued)

*Primary Examiner*—Tim Heitbrink
(74) *Attorney, Agent, or Firm*—Medler Ferro PLLC (57) ABSTRACT

In-line valve-gated nozzles for a single or multiple cavity applications wherein a valve-gated hot runner nozzle has a melt channel uniformly heated along the entire path. The valve pin is driven by an actuation device that is located adjacent to the nozzle to regulate the flow of melt. The actuation device has a linear motion and applies a uniform axial pressure on to the valve pin. This valve-gated nozzle can be linked directly to a machine nozzle, to an injection manifold or to a stack mold.

14 Claims, 11 Drawing Sheets

U.S. PATENT DOCUMENTS

| | | |
|---|---|---|
| 5,067,893 A | 11/1991 | Osuna-Diaz |
| 5,098,280 A | 3/1992 | Trakas |
| 5,288,225 A | 2/1994 | Schmidt et al. |
| 5,324,191 A * | 6/1994 | Schmidt ..................... 425/572 |
| 5,533,882 A | 7/1996 | Gessner et al. |
| 5,820,899 A | 10/1998 | Gellert et al. |
| 5,830,524 A | 11/1998 | Braun |
| 5,885,628 A | 3/1999 | Swenson et al. |
| 5,902,614 A | 5/1999 | Kuntz |
| 5,916,605 A | 6/1999 | Swenson et al. |
| 5,984,661 A | 11/1999 | Vorköper |
| 6,086,356 A | 7/2000 | Yu |
| 6,086,357 A | 7/2000 | Steil et al. |
| 6,159,000 A | 12/2000 | Puri et al. |
| 6,238,203 B1 | 5/2001 | Koh |
| 6,280,177 B1 | 8/2001 | Döbler |

FOREIGN PATENT DOCUMENTS

| | | |
|---|---|---|
| EP | 0 558 932 A | 9/1993 |
| JP | 07 266379 A | 10/1995 |

OTHER PUBLICATIONS

"Direct Channel Heating for Hot-Runners", Modern Plastics International, vol. 15, No. 9, Sep. 1985.

* cited by examiner

VALVE-GATED INJECTION MOLDING SYSTEM WITH SIDE-MOUNTED ACTUATOR

CROSS-REFERENCE TO RELATED APPLICATIONS

This application claims priority under 35 U.S.C. § 119(e) to Provisional Application No. 60/363,891 filed Mar. 14, 2002, the contents of which are incorporated in their entirety by reference herein.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX

Submitted On a Compact Disc and an Incorporation-by-Reference of the Material On the Compact Disc Not applicable.

BACKGROUND OF THE INVENTION

1. Field of the Invention

This invention relates to valve-gated injection molding systems and, in particular, those systems in which an actuator is positioned laterally from an injection nozzle body.

2. Related Art

Figure 8:
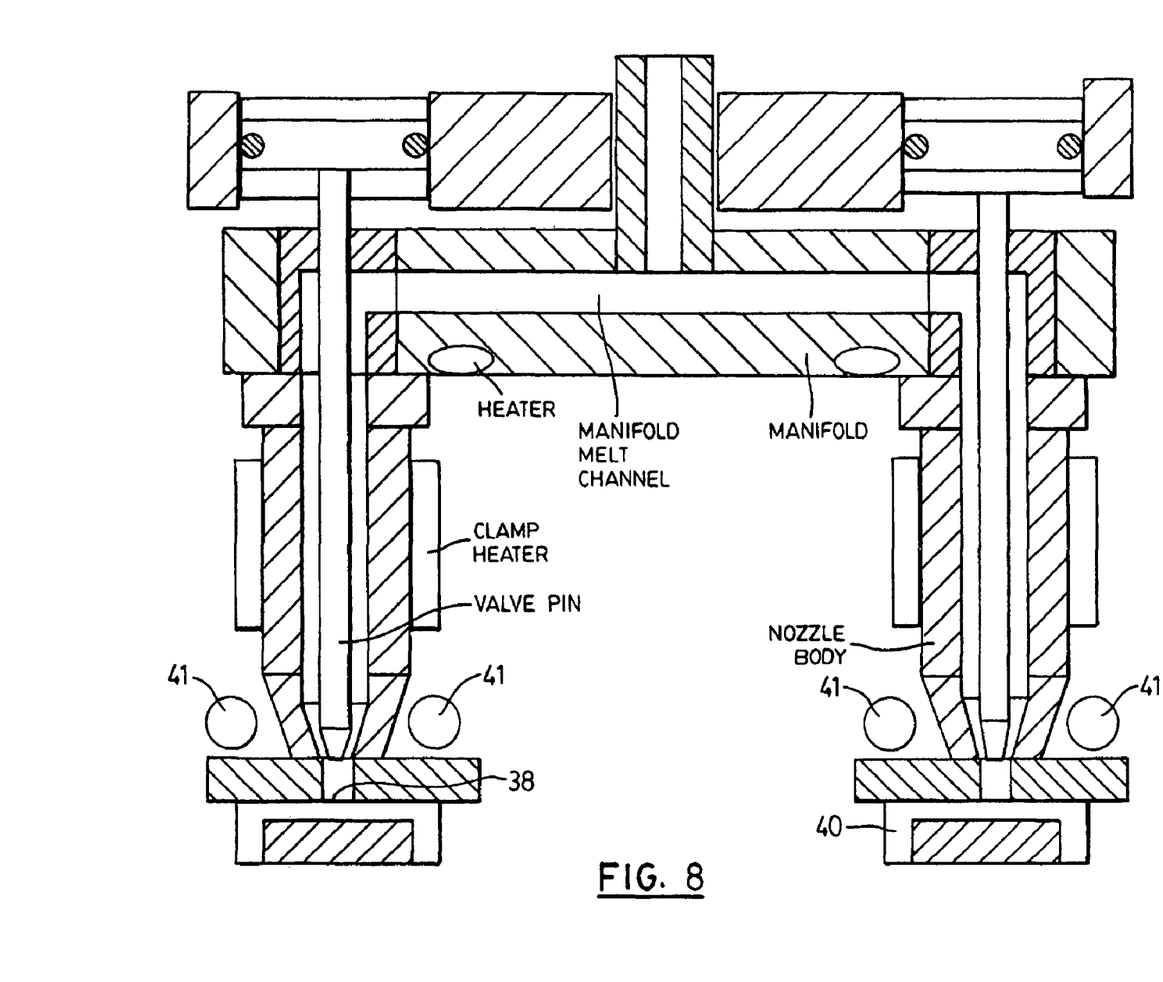
FIG. 8 is a schematic sectional view of a prior art valve-actuated injection molding system in which pistons are mounted in a mounting plate upstream of the manifold.

Valve-gated injection molding systems conventionally include a valve pin disposed in a nozzle melt channel. The valve pin extends through the manifold melt channel to a double acting air-operated piston which moves the valve pin into and out of a position that blocks the nozzle outlet. Such a conventional system can be seen, for example, in U.S. Pat. No. 4,173,448 to Rees et al. and in FIG. 8 of the drawings provided herewith. In this type of conventional system, the actuator is mounted in a plate upstream of the manifold. Such a conventional system has certain disadvantages. For example, the actuator located on top of the manifold increases the height of the overall system. Further, the valve pin is long, which increases the risk of breakage, bending, and/or misalignment within the melt channel. Still further, because the valve pin extends through the heated nozzle and the heated manifold, it is exposed to the expansion and contraction and relative movement of those parts. This further increases the risk that the valve pin may bend or become misaligned in the melt channel. Further, in systems with a large amount of mold cavities, there is greater risk of inconsistency between the different valve pins due to this bending or misalignment. Another problem with this type of valve-gated injection molding system is that melt from the manifold melt channel tends to leak up towards the piston assembly. Seals are required around the valve pin above the manifold to stop the leakage.

Other conventional systems attempt to address some of these problems. For example, U.S. Pat. No. 4,919,606 to Gellert discloses a valve-gated injection molding system wherein a cylinder and piston assembly is located to a side of the manifold. The movement of the piston is translated to the valve pin through a rack and pinion arrangement. This type of arrangement addresses the height of the overall system and the length of the valve pins. However, this system is expensive to manufacture as it uses highly accurate components. Other similar systems also move the piston assembly adjacent to the manifold or the nozzle and translate the movement of the piston laterally to actuate the valve pin, such as in shown in U.S. Pat. Nos. 5,902,614; 5,916,605; and 5,984,661. These types of arrangements suffer from difficulty in transferring axially the necessary force from the piston assembly to the valve pin. They also include bends in the nozzle melt channel that are not heated in order to allow access to the valve pin from a lateral position.

Another conventional system includes an annular slidable piston member which surrounds the nozzle and is known as an "in-line annular piston valve gated nozzle". Due to a connection between a slidable member and a valve pin, vertical motion of the slidable member causes the vertical motion of the valve pin. Such a system can be seen in U.S. Pat. Nos. 3,677,682 and 6,159,000, for example. In such systems, the slidable member is often too close to the nozzle body and is therefore subject to high temperatures which can degrade components thereof, such as annular sealing members (i.e. O-ring seals). Also, many of such systems are complicated and/or expensive to manufacture and require the use of special heat resistant materials. Furthermore, many of such systems do not have heaters or heater components for applying heat to that portion of the melt channel around which the slidable member is slidable. In those systems which do have heaters for heating such a portion of the melt channel, the heaters are often not evenly radially spaced from the melt channel, i.e. are asymmetrical relative to the melt channel, thereby resulting in either too much or too little heat being applied to melt flowing therethrough.

SUMMARY OF THE INVENTION

Due to the disadvantages noted above, there is a need for a valve-gated injection molding system wherein the nozzle melt channel is uniformly heated along its entire path, the actuator assembly is located adjacent or below the manifold, and the actuator actuates the valve pin axially without a lateral translation of the force such that sufficient force can be applied to the valve pin. Further, a relatively short valve pin that does not extend through multiple parts of the molding system is desirable.

The present invention addresses the above-noted disadvantages of conventional systems by providing an injection molding system including a nozzle body, an actuator, and a valve pin coupled to the actuator. The nozzle body includes an inlet, an outlet, and a melt channel extending from the inlet to the outlet. The outlet of the nozzle body is disposed about a first axis. The melt channel of the nozzle body includes an end portion located adjacent to the outlet and disposed about the first axis. The nozzle body also includes an offset body portion located between the inlet and the end portion that is laterally offset relative to the first axis. The actuator is disposed external to and positioned laterally from the offset body portion of the nozzle body. The actuator is disposed in a housing and includes an axial translation member located and slidable in the housing co-axially with the first axis. The valve pin is coupled to the actuator and extends along the first axis. A tip portion of the valve pin is positioned in the end portion of the nozzle body and is movable under the influence of the axial translation member between a first position in which the tip portion is clear of the outlet and a second position in which the tip portion is blocking the outlet to stop the flow of melt therethrough. The system further includes a heater disposed around the offset body portion and the end portion of the nozzle body.

Embodiments according to the present invention address the disadvantages in the prior art discussed above. Because the actuating member of the valve pin is located adjacent to the nozzle body, the overall height of the system and the length of the valve pin are minimized. The reduced length of the valve pin minimizes the risk that the valve pin will break, bend, or become misaligned during use. Further, the valve pin travels through fewer independent parts of the molding machine which, in turn, minimizes the problems associated with thermal expansion of those parts and the consequent misalignment thereof. Further, application of a force on the valve pin evenly distributed about the valve pin axis also reduces the chance that the valve pin will deviate from movement along that axis. Such deviation may lead to lateral forces on the pin which may increase the risk of breakage and leak of molten material. In one embodiment the actuation means delivers only a translation movement which is directly and coaxially transmitted to the valve pin.

Further, the actuating member of the present invention is separate from the nozzle body, which reduces exposure of the piston seals to heat. The present invention also includes a nozzle heater that is disposed symmetrically relative to the melt channel, thereby resulting in an even heat distribution. Any suitable heater can be used, however preferably embedded or film heaters are used to reduce the size of the nozzle.

BRIEF DESCRIPTION OF THE DRAWINGS/FIGURES

To better understand the invention, preferred embodiments will now be described with reference to the following drawings.

FIG. 5a is a schematic sectional view of a valve-actuated injection molding system according to another embodiment having a plurality of injection nozzles and a single off-centre double piston actuator component carrying a plurality of valve pins associated therewith.

FIG. 5b is a schematic axial view of a manifold melt passageway of the embodiment of FIG. 5a.

DETAILED DESCRIPTION OF THE INVENTION

Preferred embodiments of the present invention are now described with reference to the figures where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the invention.

Figure 1:
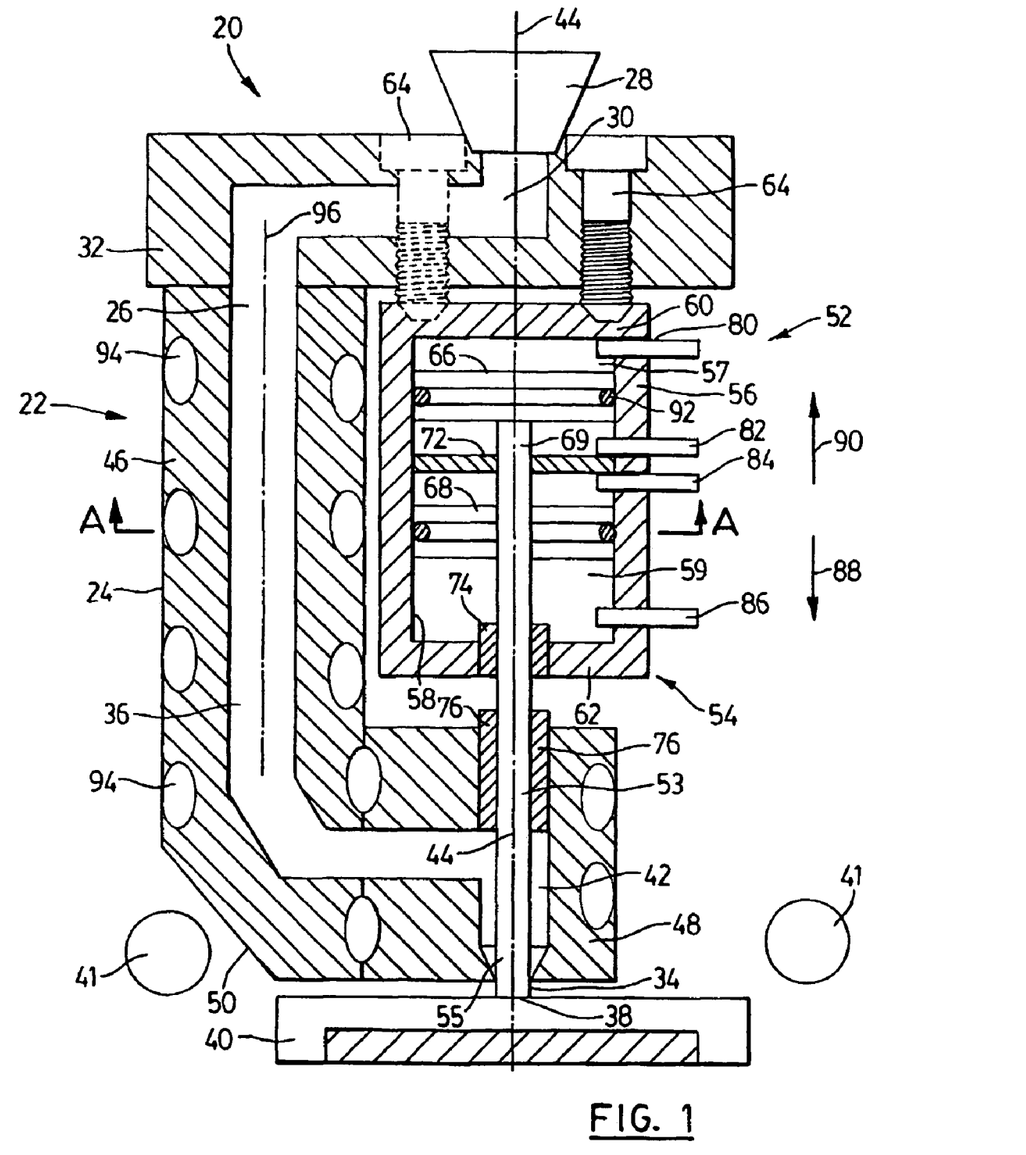
FIG. 1 is a schematic sectional view of a valve-actuated injection molding system according to an embodiment of the invention having a single injection nozzle and a co-axial double piston actuator associated therewith.
Figure 1A:
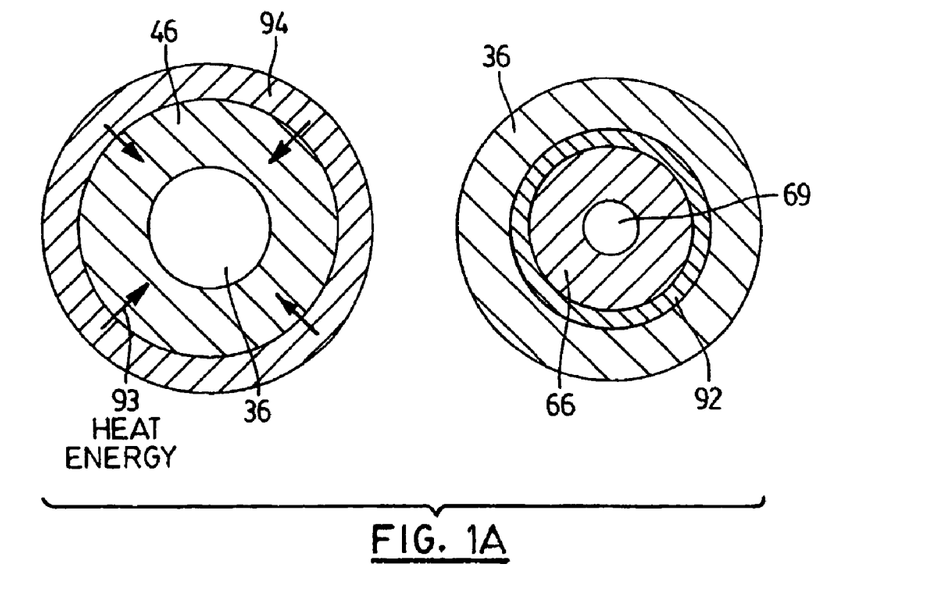
FIG. 1a is a cross-sectional view along line A—A of FIG. 1.

FIG. 1 depicts a valve-gated injection molding system 20 according to an embodiment of the invention. FIG. 1a shows a cross-section along line A—A of FIG. 1. The system 20 includes an elongated hot runner injection nozzle designated generally by reference numeral 22 having an elongated nozzle body 24. The nozzle body 24 has an inlet 26 coupled to machine nozzle 28 which discharges hot pressurized melt. Melt from the machine nozzle 28 travels through an inlet channel 30 defined by a hot runner nozzle head 32 into the inlet 26 of the nozzle body 24. The nozzle body 24 further includes an outlet 34 and defines a melt channel 36 extending between the inlet 26 and the outlet 34 through which melt flows. The melt is discharged from the outlet 34 through a mold gate 38 and into a mold cavity 40 to form the molded product. Cooling channels 41 are provided in a mold platen (not shown) to dissipate heat transferred from the nozzle body 24 to the mold platen and to freeze the mold gate 38, as is known in the art of injection molding.

As can be seen in the drawing, the melt channel 36 has an end portion 42 for receiving a tip portion of a valve pin as will be described further below. The end portion 42 is located adjacent to the outlet 34 and disposed about a first axis 44 about which the machine nozzle 28 and outlet 34 are also disposed, according to one aspect of the invention. The nozzle body 24 has an offset portion 46 located between the inlet 26 and the end portion 32. The nozzle body 24 further has an outlet or nozzle tip portion 48 defining the end portion 42 and a bridge portion 50 which connects the offset portion 46 to the outlet or nozzle tip portion 48.

The system 20 further includes a co-axial pneumatic double piston actuator, designated generally by reference numeral 52, operable to move a valve pin 53 between a first position in which a tip portion 55 of the valve pin 53, positioned in the end portion 42, is clear of the outlet 34, and a second position in which the tip portion 55 is blocking the outlet 34 to stop the flow of melt therethrough. According to another aspect of the invention, only one piston, such as 66, can be used in certain molding conditions. The actuator 52 is external to and positioned laterally from the offset portion 46 of the nozzle body 24, and has a closed cylindrical housing 54 secured to the nozzle head 32 by bolts 64. The housing 54 includes a cylindrical wall 56 which has an inner cylindrical surface 58 defined about a second axis which, in this embodiment, is co-axial with the first axis 44. The housing 54 further includes a pair of opposed, transversely-extending circular end walls 60, 62 at respective ends of the cylindrical wall 56 and a transversely-extending partition wall 72 between the end walls 60, 62 to divide the housing into two compartments 57, 59.

Located inside the housing 54 is a displaceable member which, in this embodiment, are slidable members in the form of first and second cylindrical pistons 66, 68 located one in each compartment 57, 59 and linked together by the valve pin 53 for movement in unison. The pistons 66, 68 have outer surfaces which mate with and slide within the inner cylindrical surface 58 coaxially with the first axis. Also inside the housing 54 is an axial translation member in the form of a connector pin 69 integrally formed and co-axial with the valve pin 53. The connector pin 69 is co-axial with the first axis 44 and slidable with the pistons 66, 68 in the housing 54. Seen in accordance with another aspect of the invention, the system 20 has an axial translation member having a portion 69 located and slidable in the housing 54 along the first axis 44 and a co-axial valve pin portion 53 extending into the nozzle body 24. The following description, however, will be with reference to the first described aspect of the invention and the person skilled in the art will understand how the description may be modified to accord with said other aspect.

The connector pin 69 extends through an opening in the partition wall 72 and then through a tubular valve pin guide 74 which is positioned around a central opening in the end wall 62. The valve pin guide 74 is dimensioned to receive and guide the valve pin 53 out of the housing 54 along the first axis 44. From there, the valve pin 53 enters a valve pin bushing 76 seated in an opening in the outlet portion 48 of the nozzle body 22. The valve pin bushing 76 is positioned and dimensioned to slidably receive and guide the valve pin 53 axially into the end portion 42.

To move the pistons 66, 68, and therefore the tip portion 55 into and out of the outlet 34, pressurized fluid, which in this embodiment is pressurized air, is selectively and alternately discharged into the compartments 57, 59 inside the housing 54. To do this, the actuator 52 includes first and second fluid inlets 80, 82 extending through the cylindrical wall 56 of the housing 54 into the compartment 57, one to each side of the first piston 66, and third and fourth inlets 84, 86 extending through the cylindrical wall 56 into the compartment 59, one to each side of the second piston 68. The first piston 66 is moveable between the first and second inlets 80, 82 and the second piston 68 is moveable between the third and fourth inlets 84, 86. The inlets 80, 82, 84, 86 are coupled to a mechanism (as is known in the art and not shown) which alternately supplies the first and third inlets 80, 84 and the second and fourth inlets 82, 86 with pressurized air to alternately move the pistons 66, 68 in first and second directions designated by arrows 88, 90, respectively. As the pistons 66, 68 move in the first direction 88, the valve pin 53 is moved to the second position in which the tip portion 55 is blocking the outlet 34 thereby preventing melt to flow therethrough. When the pistons 66, 68 move in the second direction 90, the tip portion 55 is moved to the first position in which it is clear of the outlet 34.

The system 20 has features for minimizing leakage of pressurized air and melt. Both the valve pin guide 74 and valve pin bushing 76 define cylindrical passageways large enough to permit the valve pin 53 to slide axially therethrough but not so large as to allow excessive leakage of air and melt from inside the housing 54 and nozzle body 24, respectively. To minimize excessive gas leakage of air from one space into another space within each compartment 57, 59, the pistons 66, 68 have circumferentially grooved surfaces in which are positioned heat-resistant O-ring seals 92. Because the valve pin 53 and connector pin 69 extend along the axis of the cylindrical pistons 66, 68, the actuator 52 is effective in applying a force to the valve pin 53 which is evenly distributed about the first axis 44. This gives rise to advantages which will later be discussed.

To maintain the temperature of the melt as it travels through the melt channel 36 in a molten state and within a predetermined desired temperature range, the system 20 has a coiled heater 94 embedded the nozzle body 24 and surrounding the melt channel 36. Heater 94 provides heat energy to melt channel 36, as represented by arrow 93 in FIG. 1a. In this embodiment, the heater 94 has a first end proximate the inlet 26 and a second end proximate the outlet 34. Thus, the heater has a heater portion which is attached to the offset portion 46 of the nozzle body 24, which heater portion is positioned coaxially relative to the portion of the melt channel 36 extending through the offset portion 36 about an axis 96. Cartridge heaters or film heaters can be used for both sections, and if the space is not a concern, band or clamp heaters can also be used.

Figure 2:
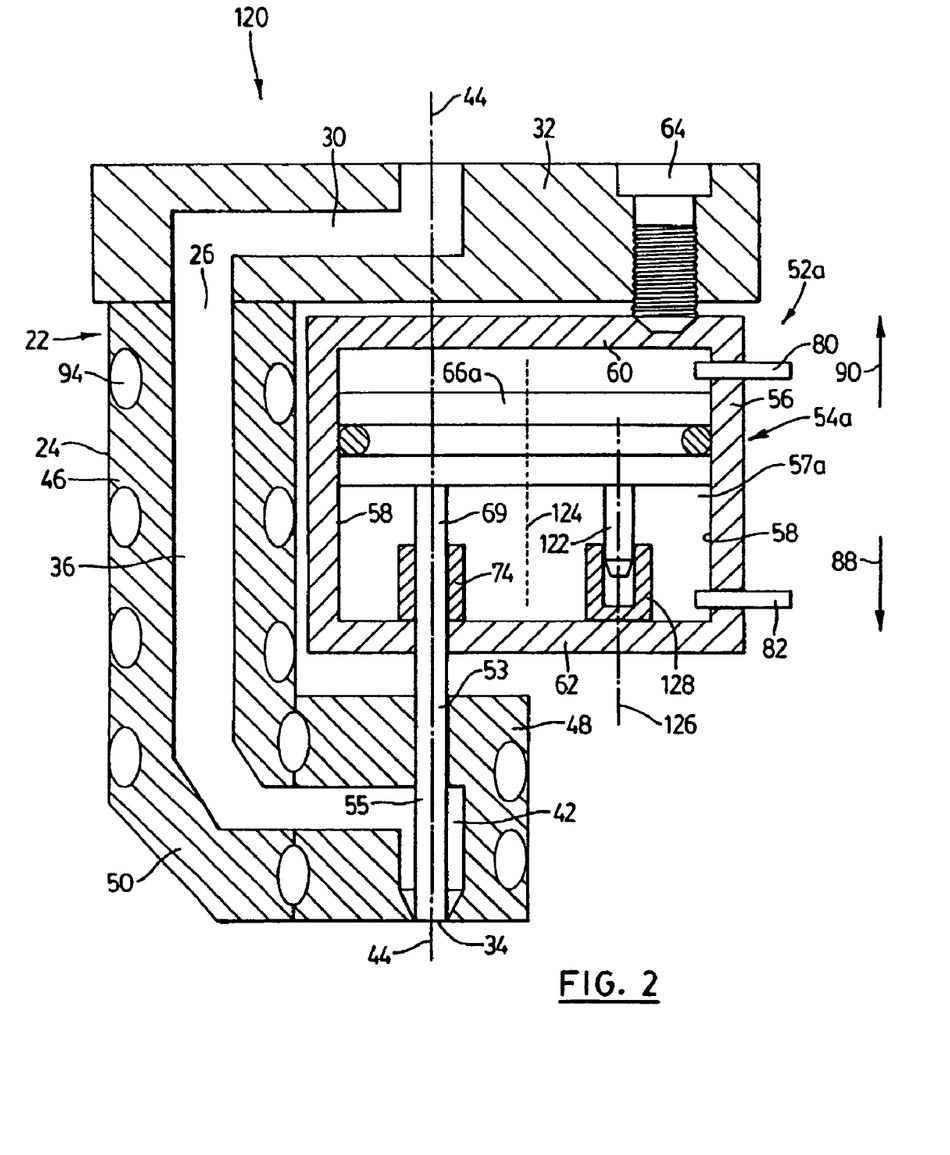
FIG. 2 is a schematic sectional view of a valve-actuated injection molding system according to another embodiment having a single injection nozzle with an off-centre single piston actuator associated therewith.

Referring now to FIG. 2, a valve-gated injection molding system according to a second embodiment of the invention, designated generally by reference numeral 120, is shown. The system 120 is similar to the system 20 in many respects. Thus, for the sake of clarity, like reference numerals have been used to refer to like parts. For the sake of convenience, only the differences relative to the first embodiment 20 will be discussed in detail.

The system 120 utilizes an off-set single piston actuator 52a having a housing 54a with a larger lateral dimension than the housing 54 of the system 20. Thus, the first described system 20 is preferred if lateral space is restricted. The present embodiment is slightly simpler in design and therefore preferred if space permits.

Similar to the system 20, the system 120 has a hot runner nozzle body 24 having an inlet 26 to be coupled to a source of pressurized melt discharged by a machine nozzle (not shown). The nozzle body 24 also has an outlet 34 disposed about a first axis 44, the nozzle body 24 defining a melt channel 36 extending from the inlet 26 to the outlet 34. The melt channel has an end portion 42 located adjacent to the outlet 34 and disposed about the first axis 44. The nozzle body 24 also has an offset body portion 46 located between the inlet 26 and the end portion 42 and being laterally offset relative to the first axis 44.

The actuator 52a is external to and positioned laterally from the nozzle body 24 relative to the first axis 44. The actuator has a closed cylindrical housing 54a attached to a hot runner nozzle head 32 by bolts 64 (only one being shown). Inside the housing is a displaceable member being a slidable member in the form of a single piston 66a. Attached to the piston 66a is an axial translation member in the form of a connector pin 69 which is similarly dimensioned, integrally formed and co-axial with a valve pin 53. The connector pin 69 is slidable in the housing 54a coaxially with the first axis 44. The valve pin 53 has a tip 55 positioned in the end portion 42 and moveable under the influence of the connector pin 69 between a first position in which the tip portion 55 is clear of the outlet 34 and a second position in which the tip portion 55 is blocking the outlet 34 to stop the flow of melt therethrough.

The housing 54a defines a compartment 57a, and a pair of fluid inlets 80, 82 extend into the compartment 57a, one on either side of the piston 66a. The piston 66a is slidable between the inlets 80, 82 and the actuator 52a further includes a mechanism (not shown) for supplying pressurized air alternately to the inlets 80, 82 to displace the piston 66a within the housing 54a. When pressurized air is supplied to the inlet 80, the piston 66a moves in a direction designated by arrow 88 and the tip portion 55 of the valve pin 53 is moved into the second position in which it blocks the outlet 34. Conversely, when pressurized air is supplied to the inlet 82, the piston 66a moves in the direction of arrow 90 and the tip portion 55 moves into the first position in which it is clear of the outlet 34.

The actuator is effective in applying a force on the valve pin 53 which is evenly distributed about the first axis 44. This is achieved by providing a balancing guide pin 122 attached to the piston 66a on the same side as the valve pin 53. As can be seen in the drawing, the housing has a cylindrical wall 56 having an inner cylindrical surface 58 defined about a second axis 124 about which the piston 66a is also defined. The guide pin 122 is disposed about a third axis 126 parallel to the first and second axes 44, 124, the first and third axes 44, 126 being equidistantly radially spaced from the second axis 124 in opposite directions. The housing 54a has a first guide in the form of a cylindrical valve pin guide 74, attached to an end wall 62 of the housing 54a which is configured, positioned and dimensioned to receive and guide the valve pin 53 out of the housing 54a along the first axis 44. The housing 54a further includes a second guide 128 which is also attached to the end wall 62 and is positioned, configured and dimensioned to receive and guide the guide pin 122 along the third axis 126. As the integral valve and connector pins 53, 69 are laterally spaced from the axis of the piston 66a, such being the second axis 124, the presence of the guide pin 122 and second guide 128 promotes retention of the lateral orientation of the piston 66a as it slides within the housing 54a. This, in turn, helps to ensure that a force is applied to the valve pin 53 which is evenly distributed about the first axis 44.

The valve pin guide 74 also acts as a seal around the connector portion 69 to prevent excessive leaking of gas from the compartment 57a. Although not shown, the hot runner nozzle 22 also has a valve pin bushing seated in an opening leading into the outlet portion 48 and positioned, configured and dimensioned to receive the valve pin 53 and guide it into the end portion 42 along the first axis 44. The valve pin bushing is dimensioned to act also as a seal to minimize leakage of melt out of the outlet portion 48 of the nozzle body 24.

To ensure that melt flowing through the melt channel 36 is maintained between a predetermined desired temperature range, the system 120 also includes a coiled heater 94 embedded in the nozzle body 24. As in the case of the first embodiment, the heater 94 has one end proximate the inlet 26, an opposite end proximate the outlet 34 and an intermediate portion surrounding the offset portion 46 coaxially relative to the portion of the melt channel 36 extending through the offset portion 46.

Figure 3:
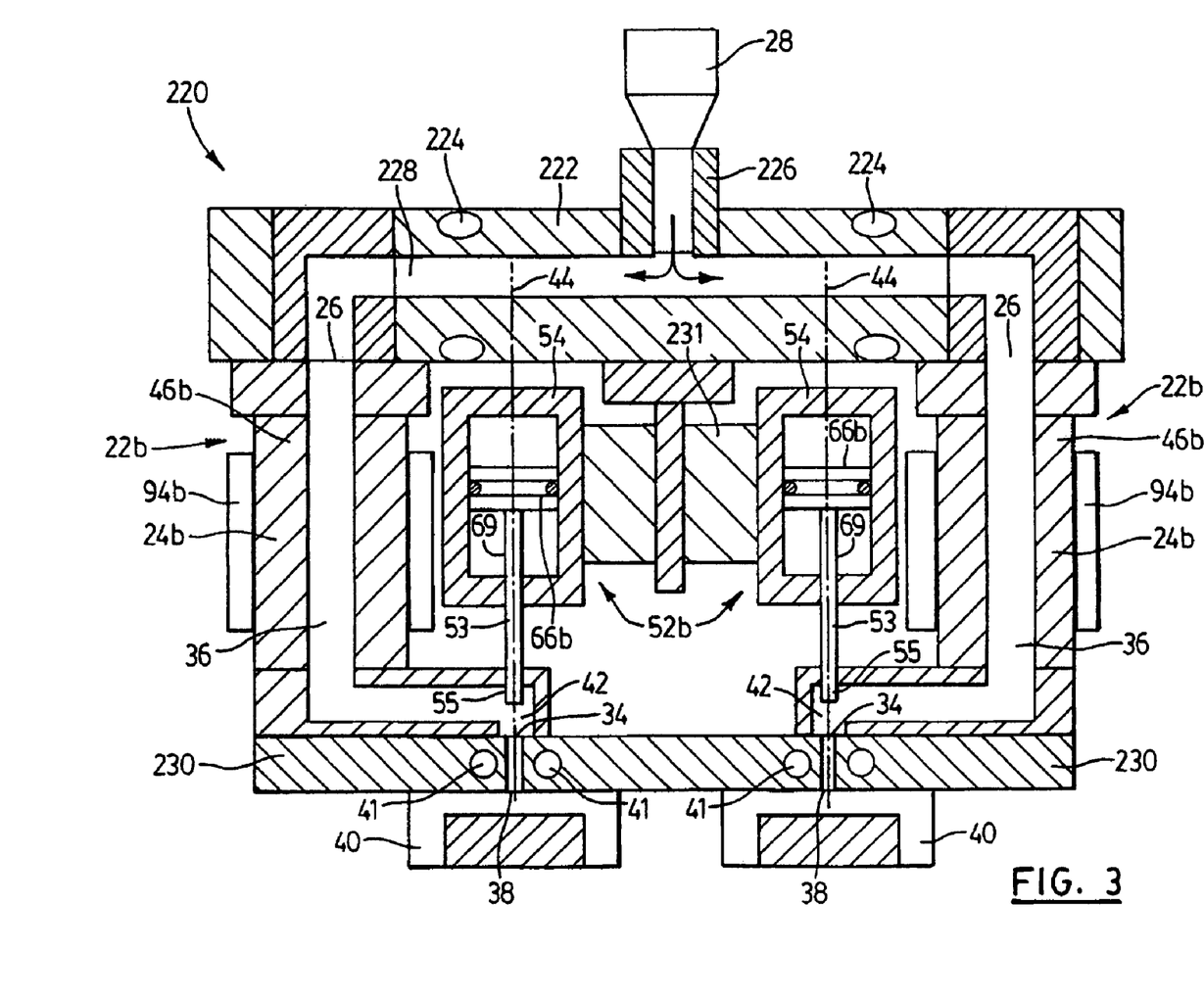
FIG. 3 is a schematic sectional view of a valve-actuated injection molding system according to another embodiment having a plurality of valve-gated injection nozzles and a corresponding plurality of co-axial single piston actuator components associated therewith.

Referring now to FIG. 3, a valve-gated injection molding system according to a another embodiment of the invention, designated by reference numeral 220 is shown. Once again, like reference numerals have been used to refer to like parts and only the differences between this embodiment and the first preferred embodiment will be described in detail. The system 220 includes two hot runner nozzles 22b connected to a heated manifold 222 in which are embedded manifold heaters 224. Hot pressurized melt is discharged from a machine nozzle 28 into a sprue bushing 226. From there, the melt flow through a manifold melt channel 228, into inlets 26 of the hot runner nozzles 22b, through melt channels 36 defined by nozzle bodies 24b of the hot runner nozzles 22b, and is discharged through outlets 34. The melt then flows through channels in a mold plate 230 and into mold cavities 40. Cooling channels 41 are disposed in the mold plate 230 to keep it cool.

Once again, the outlets 34 are disposed about a first axis 44 and the nozzle bodies 24b have end portions 42 located adjacent to the respective outlets 34 and disposed about first axes 44. The nozzle bodies 24b also have offset body portions 46b located between the inlets 26 and the end portions 42 and being laterally offset relative to the respective first axes 44.

The system 220 further includes an actuator 52b external to and positioned laterally from the nozzle bodies 24b relative to the first axis 44. The actuator 52b has two closed cylindrical housings 54 and an axial translation member in the form of a connector pin 69 located and slidable in each housing 54 coaxially with the first axes 44. Integrally connected with the connector pins 69 are respective valve pins 53 also extending along the first axis 44. The valve pins 53 have respective tip portions 55 positioned in the end portions 42 and moveable under the influence of the connector pins 69 between a first position in which the tip portions 55 are clear of the outlets 34 and a second position in which the tip portions 55 are blocking the outlets 34 to stop the flow of melt therethrough.

In this embodiment, the housings 54 are mounted to a central mounting member 231 which is coupled to the manifold 222. Located in each housing 54 is a displaceable member which is a slidable member in the form of a single coaxial with and slidable along the first axis 44. The pistons 66b are displaceable under the influence of pressurized air entering spaces on either side of the pistons through inlets (not shown). A mechanism (also not shown) is operatively coupled to the inlets to supply the inlets with pressurized air in alternating fashion.

To heat melt flowing through the melt channels 36 a clamp heater 94b is mounted to each offset portion 46b. The claim heaters 94b are coaxial with the portions of the melt channels 36 flowing through the offset portions 46b and thereby apply balance heat to that portion.

It will be appreciated that the system 220 may include additional injection nozzles and a corresponding number of pistons, housings, and valve pins to suit different manifold configurations and other molding parameters. For example, one can use a single manifold and two opposed arrays of nozzle to apply this valve gating arrangement to a stack mold injection molding machine.

Figure 4:
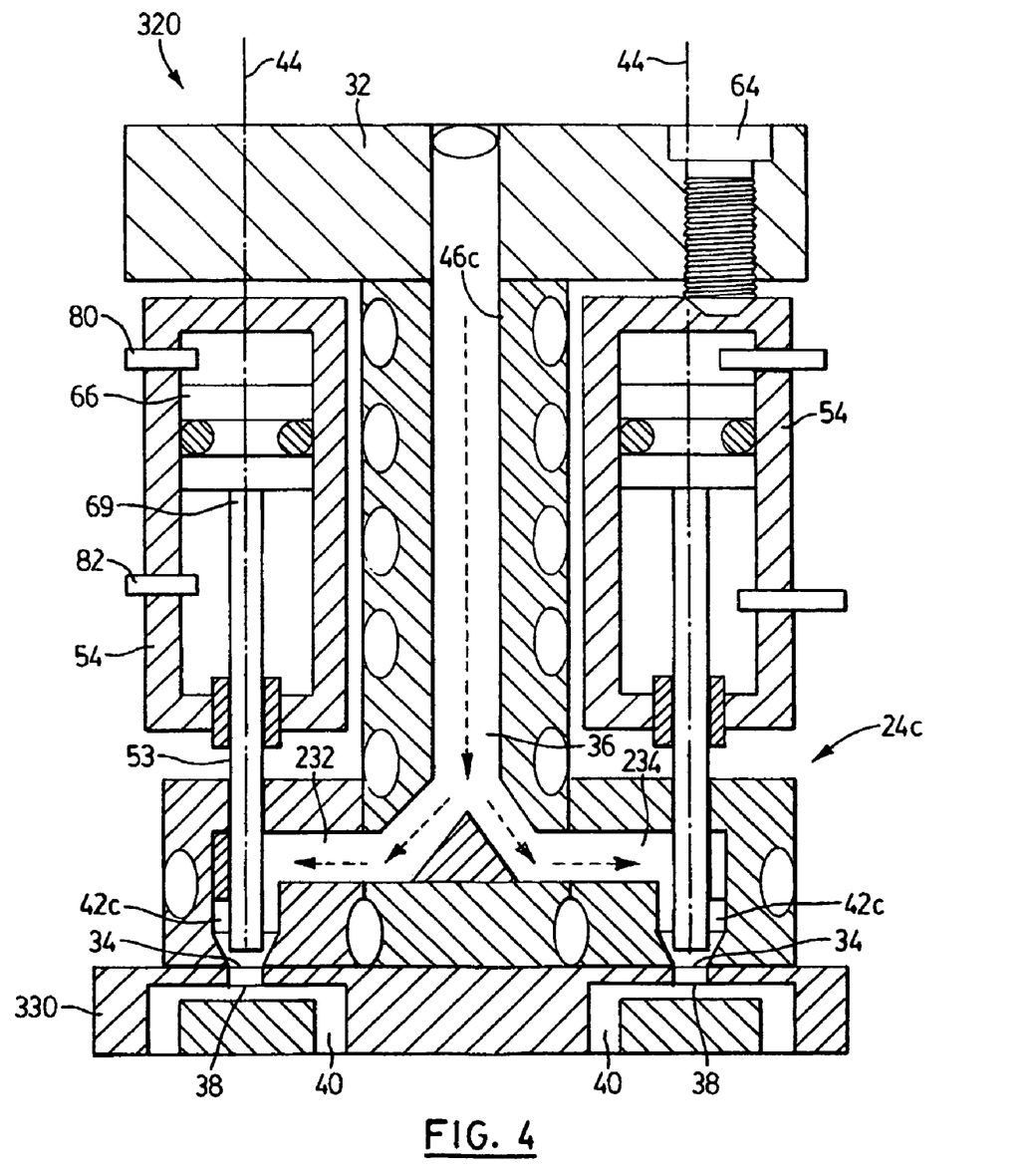
FIG. 4 is a schematic sectional view of a valve-actuated injection molding system according to another embodiment having a single bifurcated injection nozzle with a plurality of co-axial single piston actuator components associated therewith.

Referring now to FIG. 4, a valve-gated injection molding system according to another embodiment of the invention, designated generally by reference numeral 320, is shown. Once again, like reference numerals have been used to denote like parts and only differences relative to the earlier described embodiments will be discussed in detail. The system 320 includes a single split nozzle body 24c having a single offset portion 46c and two end portions 42c. Each end portion 42c is defined about a first axis 44 along which a respective valve pin 53, connector pin 69, and piston 66 extends.

In this embodiment, the melt channel 36 splits into two channels 232, 234, downstream of the offset portion 46c, leading to respective outlets 34. Thus, this is an example of a system having a single split nozzle body 24c defining a split melt channel 36 having a plurality of end portions 42c adjacent to a corresponding plurality of outlets 34, the system also having a corresponding plurality of valve pins 53, axial translation members in the form of integral connector pins 69, and housings 54.

Figures 5A, 5B:
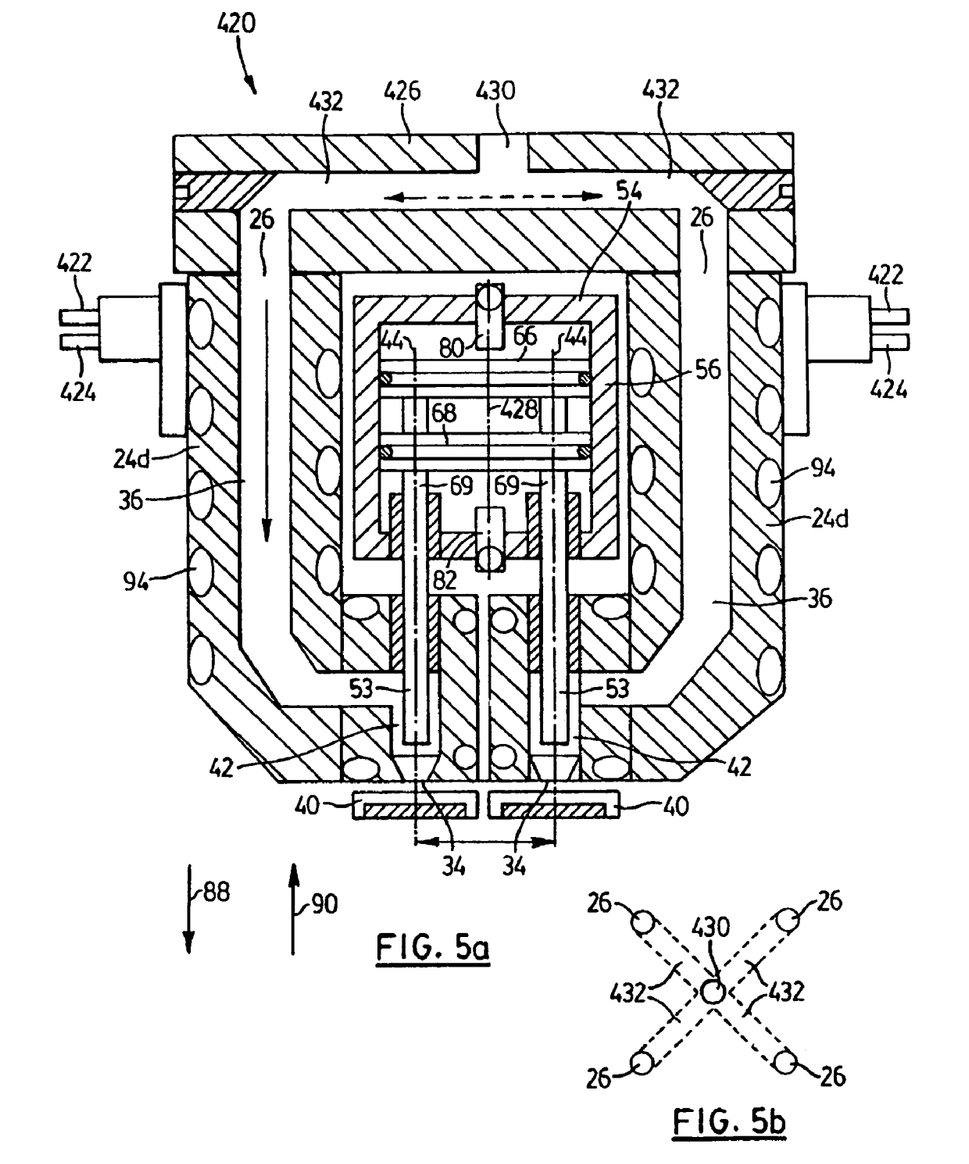

FIG. 5a depicts a valve-gated injection molding system according to another embodiment of the invention and designated generally by reference numeral 420. The system 420 includes four nozzle bodies 24d, four valve pins 53 and four axial translation members in the form of integral connector pins 69 slidable in a single housing 54 (only two of each being shown). The same design is applicable to two, three or more valve gated outlets. Also shown are electrical wires 422, 424 which carry current to and from coiled heaters 94 embedded in the nozzle bodies 24d, as is known in the art. The nozzle bodies 24d are connected to a manifold 426 which carries melt from a machine nozzle (not shown) to inlets 26 of the nozzle bodies 24d. Like the earlier embodiments, the system 420 has a pneumatically-operated actuator which includes two pistons slidable in the housing 54. The integral connector pins 69 are connected to both pistons for movement therewith in unison along respective first axes 44. The first axes 44 are equidistantly laterally spaced from a second axis 428 about which the pistons 66, 68 and cylindrical wall 56 of the housing 54 are defined. Consequently each connector pin 69 or valve pine 53 serves to balance the other and the actuator is effective in applying forces on the valve pins 53 which are evenly distributed about the first axes 44.

In this embodiment, the pistons are moved in the direction of arrow 88 by pressurized air discharged through an inlet 80 extending into the housing 54. Conversely, pistons 66, 68 are moved in the direction of arrow 90 by pressurized air discharged into the housing through an inlet 82.

The manifold 426 has four manifold melt channels leading from a central channel 430 to respective inlets 26 of the nozzle bodies 24d. This will be more readily understood with reference to FIG. 5b which is a schematic illustration of the manifold melt channels 432 from an axial perspective. Thus, the system 420 comprises a plurality of nozzle bodies 24d arranged laterally around a single housing 54 and a corresponding plurality of each of the axial translation members (i.e. connector pins 69) and the valve pins 53.

Figure 6A:
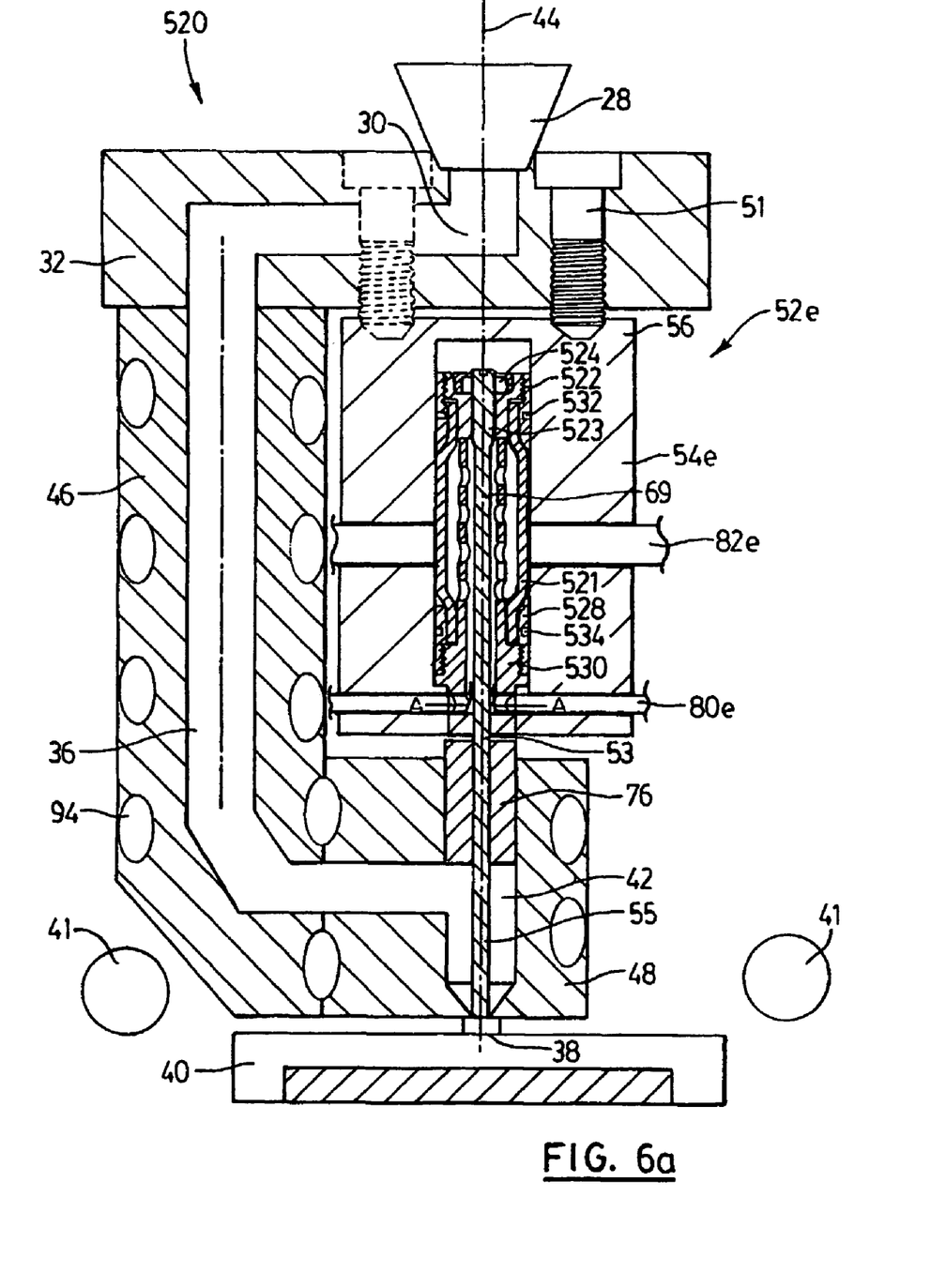
FIG. 6a is a schematic sectional view of a valve-actuated injection molding system according to another embodiment having a single injection nozzle and a bladder actuator associated therewith, the bladder actuator having a bladder shown in an expanded condition.
Figure 6B:
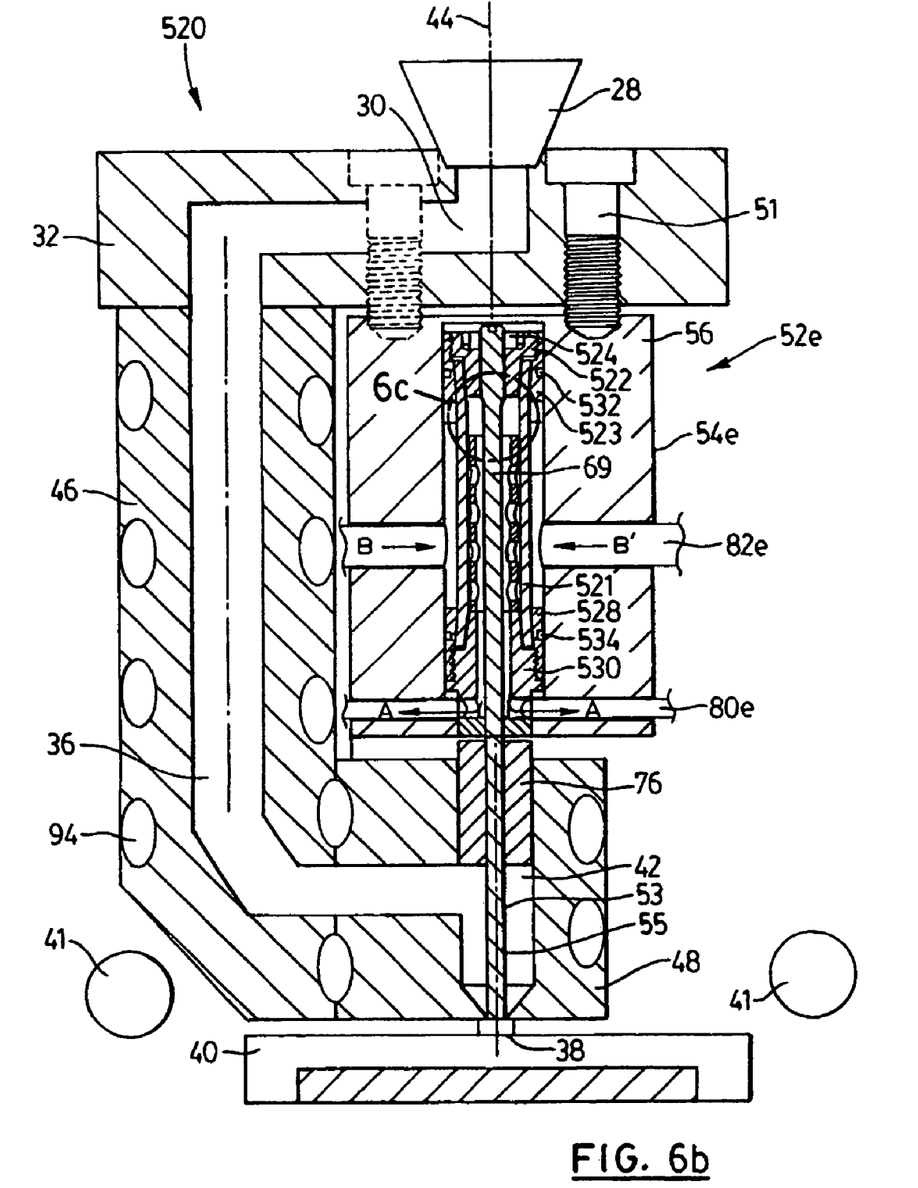
FIG. 6b is a schematic sectional view of the valve-actuated injection molding system of FIG. 6a in which the bladder is in a collapsed condition.

Referring now to FIG. 6a, a valve-gated injection molding system 520 according to another embodiment of the invention is shown. The system 520 is similar in every respect to the system 20 except that it employs a known bladder actuator 52e shown in this figure to be in a closed position. The actuator 52e has a cylindrical housing 54e bolted to the nozzle head 30 laterally from an offset body portion 46 of the nozzle body 24. The system 520 comprises an elongate valve pin 53 extending along a first axis 44 and having a tip portion 55 positioned in the end portion 42. The valve pin 53 is operatively coupled to a displaceable member in the form of a flexible bladder 521 located in the housing 54e and dividing the housing 54e into first and second spaces, the first space being inside the bladder 521, the second space being outside of the bladder 521. The actuator 52e further includes a pair of first and second inlets 80e, 82e, extending through the housing and communicating with the first and second spaces, respectively, and a mechanism (not shown) operable to alternately supply pressurized fluid in the form of pressurized air to the first and second inlets 80e, 82e. When pressurized air is supplied to the first space, the bladder 521 moves in a first direction, i.e. expands, as shown in this figure. When pressurized air is supplied to the second space, the bladder 521 moves in a second direction, i.e. collapses, as shown in FIG. 6b. The valve pin 53 is operatively coupled to the bladder and movable to a first position in which the tip portion 55 is clear of the outlet 34 when the bladder 521 collapses, and to a second position in which the tip portion 55 is blocking the outlet 34 to stop the flow of melt therethrough when the bladder 521 expands.

Integrally and co-axially formed with the valve pin 53 is a connector pin 69 of the actuator 52e. In this embodiment, the actuator 52e has a pin attachment 522 is affixed to the connector pin 69 by the use of threads. A lock nut 524 is further threaded on the top of the connector pin 69 to secure the pin attachment 522 to the connector pin 69. It will be appreciated that the use of threads in the foregoing description is for illustration purposes only. A multitude of attachment means could easily be employed by someone skilled in the art.

The bladder 521 is fixedly attached to the pin attachment 522 through a wedging action by installation of a top plug 523. The wedging action between the top plug 523 and the pin attachment 522 is sufficient to provide a reliable seal for containment of pressurized air in the bladder 521. The bladder 521 is manufactured from flexible material like rubber including fiber reinforced rubber.

The actuator 52e further comprises a fixed inner cylinder 530 which interfaces with a bottom wall of the housing 54c. The inner cylinder 530 is located inside the bladder 521 and surrounds the connector pin 69 thereby providing an annular conduit for the transmission of pressurized air to the inside of the bladder 521. A bottom area of the bladder 521 is fixedly attached to the inner cylinder 30 also by a wedging action through the installation of a bottom plug 528. The wedging action between the inner cylinder 530 and the bottom plug 528 is sufficient to provide a reliable seal for the containment of pressurized air inside the bladder 521.

The inner cylinder 530 further comprises at least one hole that aligns with the inlets 80e for the communication of pressurized air to the inside of the bladder 521. In this embodiment the inner cylinder has a plurality of holes along the wall of the inner cylinder 530 which allow the communication of pressurized air to expand the walls of the bladder 521 thereby reducing the overall length of the bladder 521.

As the walls of the bladder 521 expand, and the overall length of the bladder 521 is reduced, the pin attachment 522 moves downwardly along an inner cylindrical surface of a cylindrical wall 56 of the housing 54e. This motion in turn moves the position of the valve pin 53 to the second position thereby blocking the outlet 34 and stopping the flow of melt therethrough.

When the bladder 521 is fully expanded, the top surface of the inner cylinder 530 contacts a bottom surface of the pin attachment 522 thereby preventing continued motion. A top seal 532 and a bottom seal 534 are provided to prevent the leakage of the pressurized air. These seals are high temperature resistant O-rings; however, other suitable seals may be used as are known in the art.

Referring to FIG. 6b, the bladder is collapsed by supplying pressurized air to the inlets 82e (as shown by arrows B'). As the bladder 521 is collapsed, any pressurized air inside the bladder 521 escapes as shown by arrows A, and the length of the bladder 521 increases. As the bladder 521 lengthens, it retracts the connector pin 69 integrally formed with the valve pin 53, thereby moving the tip portion 55 of the valve pin 53 clear of the outlet 34.

Figure 6C:
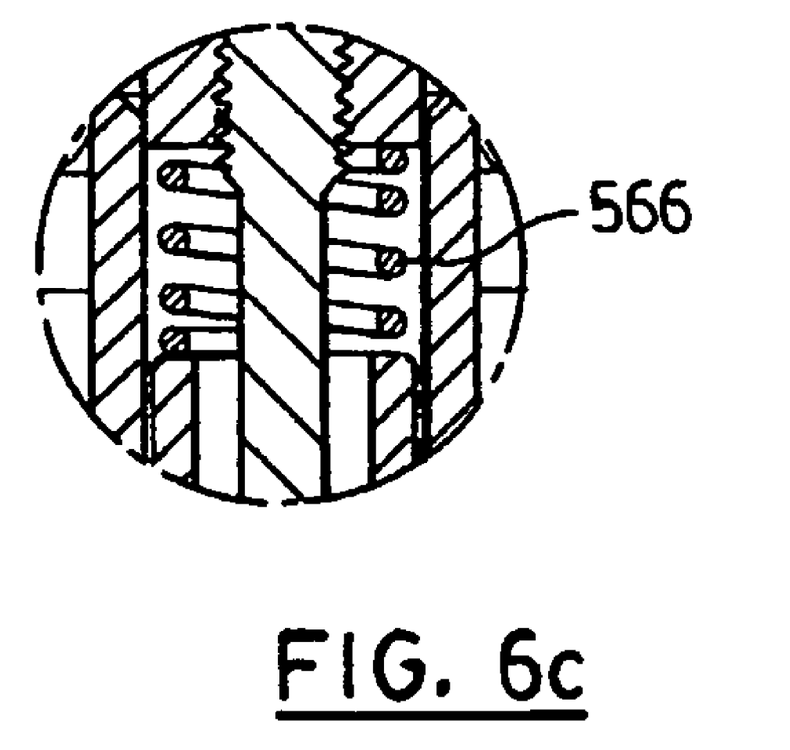
FIG. 6c is an enlarged view of the area designated by reference numeral 6c in FIG. 6b.

FIG. 6c is an enlarged view of the area designated by reference numeral 6c in FIG. 6b and shows an alternative means for retracting the connector pin 69 and hence valve pin 53. Instead of supplying pressurized gas to the inlet 82e, a spring 566 may be axially located between and contacting the pin attachment 522 and the inner cylinder 530 thereby applying a force on the pin attachment 522 to move it upwardly thereby collapsing the bladder 521. As a further alternative, conditions may exist where one could rely on the resiliency of the bladder 521 itself to return to a collapsed state thereby moving the tip portion 55 of the valve pin 53 clear of the outlet 34.

Figure 7:
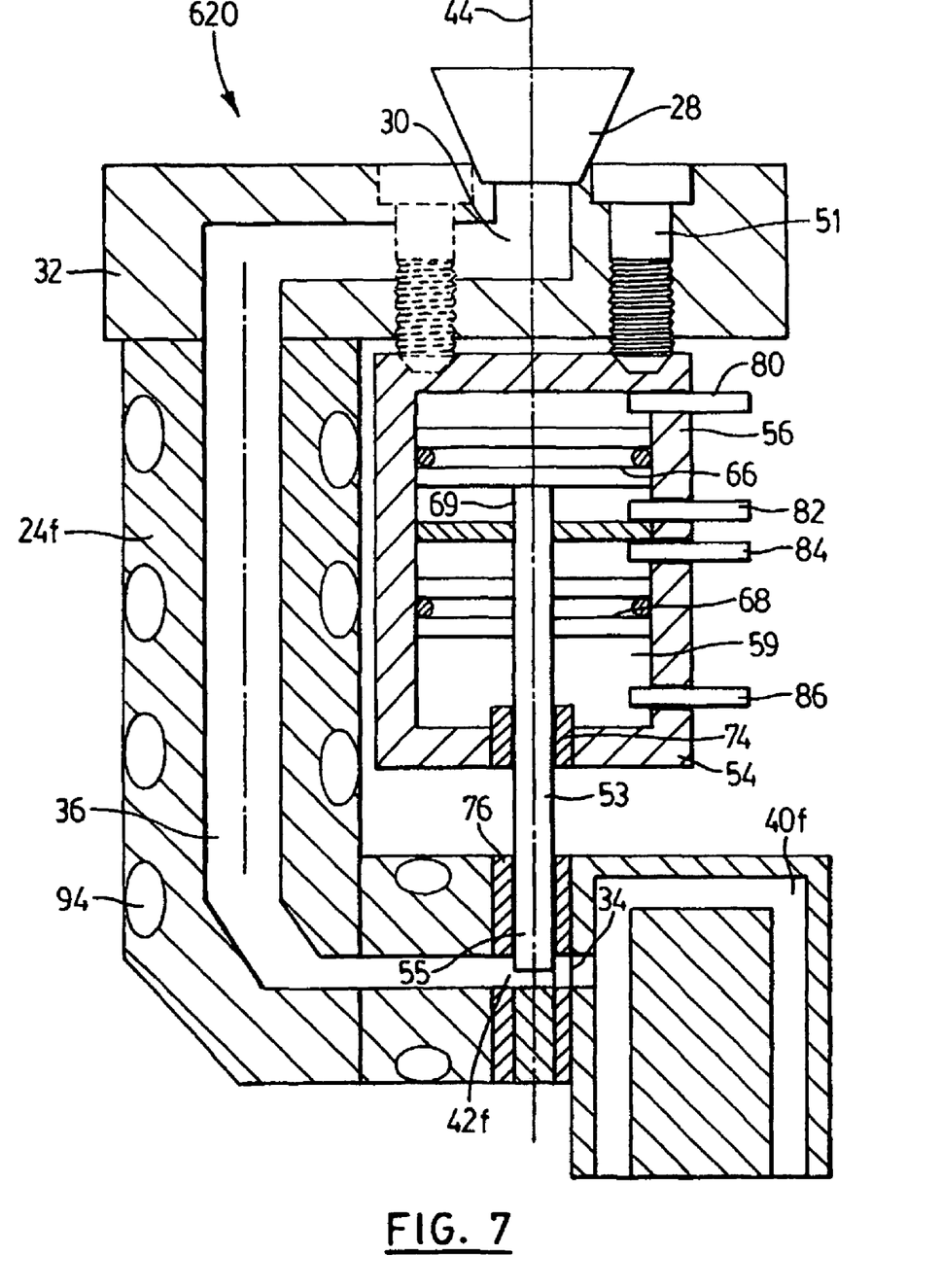
FIG. 7 is a schematic sectional view of a valve-actuated injection molding system according to another embodiment of the invention having a valve pin positionable in a melt channel of an injection nozzle adjacent to and upstream of an outlet of the nozzle to block the flow of melt through the outlet.

FIG. 7 shows a valve-actuated injection molding system 620 according to a further aspect of the invention. This system is used for edge or side injection molding applications, where the mold gate 34 is located on any side of the cavity. The system 620 is similar in every respect to the system 20 except that it includes an end portion 42f located adjacent to an outlet 34 which end portion 42f and outlet 34 are not defined about a first axis 44 about which a valve pin 53 and integral connector pin 69 extend. In this embodiment, the end portion 42f and outlet 34 are disposed transversely to the first axis 44 and the outlet 34 leads into a mold cavity 40f disposed laterally from the first axis 44 rather than axially as in the case of the earlier embodiments. Thus, the valve pin 53 has a tip portion 55 positioned in the end portion and is movable under the influence of the axial translation member (i.e. connector pin 69) between a first position in which the tip portion is clear of the melt channel 36 and a second position in which it is blocking the melt channel to stop the flow of melt through the outlet.

Numerous alternatives to the above described embodiments will become apparent to the person skilled in the art. For example, the actuators may be fluid operated including using different gases and liquids such as oil. Furthermore, a solenoid arrangement may be used instead of a pneumatic piston arrangement, such as that described in U.S. Pat. No. 5,288,225.

It will further be appreciated that the invention provides valve-gated injection molding system which may be mounted to a manifold or directly to a machine nozzle. Also, while particularly useful in connection with in-line systems, the invention is not to be limited to such systems and may be for single cavity, multi-cavity and stack mold applications.

While the invention has been particularly shown and described with reference to preferred embodiments thereof, it will be understood by those skilled in the art that various changes in form and details may be made therein without departing from the spirit and scope of the invention, and that the invention is defined by the claims that follow.

What is claimed is:

1. A valve-gated injection molding system comprising:
   a nozzle body having an inlet, an outlet, and a melt channel extending from said inlet to said outlet, the melt channel having an end portion located adjacent to said outlet, the nozzle body having an offset body portion located between said inlet and said end portion and being laterally offset relative to a first axis;
   an actuator external to and positioned laterally to only one side of said offset body portion relative to said first axis, the actuator having a housing and a piston disposed entirely within the housing and slidable in the housing co-axially with said first axis; and
   a valve pin extending along said first axis, the valve pin being connected to the piston and having a tip portion positioned in said end portion and movable under the influence of the piston between a first position in which the tip portion does not stop the flow of melt through the melt channel in said end portion and a second position in which the tip portion stops the flow of melt though said end portion.

2. The system according to claim 1 further comprising an outlet body portion of said nozzle body disposed around said end portion of said melt channel and a coiled heater disposed around said offset body portion and said outlet body portion to provide an evenly distributed heat to the melt channel.

3. The system according to claim 1 wherein said outlet is disposed about said first axis.

4. The system according to claim 3 wherein said tip portion of said valve pin is clear of said outlet in said first position and is blocking said outlet in said second position.

5. The system according to claim 1 wherein said outlet is substantially perpendicular to said first axis.

6. The system of claim 5, wherein said end portion of said melt channel is substantially perpendicular to said first axis and said tip portion of said valve member is clear of said end portion in said first position and transverses said end portion in said second position.

7. The system according to claim 1 wherein said housing is closed and further comprises a first guide mounted to the housing about an opening therethrough, said first guide being configured, positioned and dimensioned to receive and guide said valve pin out of the housing along said first axis.

8. A valve-gated injection molding system comprising:
   a nozzle body having an inlet, an outlet, and a melt channel extending from said inlet to said outlet, the melt channel having an end portion located adjacent to said outlet, the nozzle body having an offset body portion located between said inlet and said end portion and being laterally offset relative to a first axis;
   an actuator external to and positioned laterally to one side of said offset body portion relative to said first axis, the actuator having a housing and an axial translation member located and slidable in the housing, wherein said axial translation member is connected to a slidable member, said housing comprising a wall having an inner cylindrical surface defined about a second axis parallel to said first axis, said slidable member having an outer surface which mates with said inner cylindrical surface and being slidable co-axially with said second axis; and
   a valve pin extending along said first axis, the valve pin being connected to the axial translation member and having a tip portion positioned in said end portion and movable under the influence of the axial translation member between a first position in which the tip portion does not stop the flow of melt through the melt channel in said end portion and a second position in which the tip portion stops the flow of melt though said end portion,
   wherein said housing is closed and further comprises a first guide mounted to the housing about an opening therethrough, said first guide being configured, positioned and dimensioned to receive and guide said axial translation member out of said housing along said first axis.

9. The system according to claim 8 wherein said first and second axes are spaced apart whereby said axial translation member is positioned off-center relative to said slidable member, said actuator further comprising a guide pin rigidly coupled to said slidable member and extending along a third axis parallel to said first and second axes, said first and third axes being equidistantly radially spaced from said second axis in opposite directions, said housing further having a second guide mounted thereto and configured, positioned and dimensioned to slidably receive and guide said guide pin along said third axis.

10. The system according to claim 1, further comprising a plurality of nozzle bodies in fluid communication with a manifold.

11. The system according to claim 1, further comprising a single nozzle body surrounded by a plurality of actuators to drive a plurality of valve pins to control a plurality of mold gates.

12. A valve-gated injection molding system comprising:
a nozzle body having an inlet, a plurality of outlets, and a melt channel extending from said inlet to said plurality of outlets, the melt channel having a plurality of end portions, each end portion located adjacent to a corresponding one of said outlets, the nozzle body having an offset body portion located between said inlet and said end portions;
a plurality of actuators external to and positioned laterally from said offset body portion, each of said actuators having a housing and a piston completely enclosed within the housing and slidable in the housing along an axis of the piston; and
a plurality of valve pins, each of said plurality of valve pins associated with a corresponding one of said plurality of actuators and pistons, wherein each of said plurality of actuators extends along said axis of the piston corresponding to said valve pin, each valve pin being connected to the corresponding piston and having a tip portion positioned in said corresponding end portion and movable under the influence of the corresponding piston between a first position in which the tip portion does not stop the flow of melt through the melt channel in said end portion and a second position in which the tip portion stops the flow of melt though said end portion.

13. The system according to claim 1 wherein said outlet is disposed about said first axis and said tip portion of said valve pin is clear of said outlet in said first position and is blocking said outlet in said second position.

14. The system according to claim 1 wherein said outlet is substantially perpendicular to said axis, said end portion of said melt channel is substantially perpendicular to said first axis, and said tip portion of said valve member is clear of said end portion in said first position and transverses said end portion in said second position.

* * * * *